United States Patent [19]

Equitz, Jr. et al.

[11] 4,432,577
[45] Feb. 21, 1984

[54] PHONOGRAPH RECORD HOLDING DEVICE

[76] Inventors: Russell E. Equitz, Jr., 252 Mariposa, #B, Sierra Madre, Calif. 91024; Bruce K. Strong, 7535 Sunstone Ave., Cucamonga, Calif. 91730

[21] Appl. No.: 482,178

[22] Filed: Apr. 5, 1983

[51] Int. Cl.³ .............................................. B65G 7/12
[52] U.S. Cl. ........................................ 294/16; 294/33
[58] Field of Search ................ 294/16, 1 R, 27 R, 33, 294/31.2, 31 R, 70, 99 R, 106; 24/255 R, 255, 1; 274/1 R, 1 J

[56] References Cited

U.S. PATENT DOCUMENTS 3,219,375  11/1965  Von Pett ............................. 294/16
4,079,979  3/1978  Schweizer ........................... 294/16

Primary Examiner—James B. Marbert
Attorney, Agent, or Firm—William L. Chapin

[57] ABSTRACT

A device for grasping, holding, manipulating and transporting phonograph record discs comprises curved vertically pivotable jaws closable by means of thumb and finger pressure applied to tapered actuator buttons slidably mounted in a tapered transverse channel formed by rear extensions of the jaws.

19 Claims, 8 Drawing Figures

PHONOGRAPH RECORD HOLDING DEVICE

BACKGROUND OF THE INVENTION (a) Field of the Invention

The present invention relates to devices for manipulating disc-shaped phonograph records without requiring direct physical contact between a person's fingers and the recorded surface.

Phonograph records are made from soft plastic materials. For that reason, the grooves containing audio information on the record playing surface are easily scratched, resulting in degradation in the fidelity of the sound reproduced from a record which has been scraped by fingernail or other hard object. Moreover, the small size and spacing of the grooves on a record makes the grooves susceptible to contamination by abrasive dust, soil and oil from the hands, which can also result in degradation in the quality of the sound played back from the record. Accordingly, it would be desirable to provide means for handling phonograph records which elminated the necessity for contact between the grooved playing surface of the record by any object, and especially the fingers. Thus, a need exists for a device which permits disc-shaped phonograph records to be picked up, manipulated and transported without requiring direct physical contact between a person's fingers and the grooved playing surface of the record. The present invention fulfills that need.

(b) Description of the Prior Art

Morrison, in U.S. Pat. No. 3,282,589, Nov. 1, 1966, discloses a disc handler comprising a scissors-like device having at the end of one blade of the scissors a pin for engaging the spindle hole of a disc, and a truncated second blade of the scissors having a groove lying in a plane parallel to the pivoted plane of the scissors to engage the outer edge of a disc when the scissors are closed.

Onanian, in U.S. Pat. No. 3,558,169, Jan. 26, 1971, discloses a curved sleeve made of flexible material having a U-shaped inner channel adapted for sliding the sleeve over the edge of a disc. The front edges of the parallel sides of the sleeve forming the channel taper in opposite directions towards the respective outer edges of the sleeve which define its width. As a result of the tapered front edges, the front edges of the sleeve sides have the shape of non-overlapping triangular tabs which facilitate insertion of the long tab underneath the bottom edge of a disc. The disc is then grasped by squeezing upper and lower tabs together between the fingers.

Yokum, in U.S. Pat. No. 3,961,819, June 8, 1976, discloses a semicircular arm having a semicircular inwardly opening groove along its inner periphery, the groove being of a size that permits sliding the arm over the edge of a disc.

Smith, in U.S. Pat. No. 4,042,106, Aug. 16, 1977, discloses an essentially semi-circular sleeve made of soft paper or flexible material, for slipping over a record. The plan-view shape of the sleeve is a segment of circle slightly less than a full semi-circle, permitting the sleeve to be slid over a record without covering the spindle hole.

Schweizer, in U.S. Pat. No. 4,079,979, Mar. 21, 1978, discloses two parallel flexible opposed oval discs that may be slid over the edge of a record disc. The disc is grasped by applying finger pressure on the outer surfaces of the disc. The lower disc tapers forward to a point to facilitate inserting the front edge of the lower disc between two records. The upper disc has a flat upward curving front edge to prevent the upper disc from engaging the record edge at a single point.

Palmour et al, in U.S. Pat. No. 2,723,877, Nov. 14, 1955 discloses a phonograph record holding device comprising opposed spaced grooved "wing" members rigidly secured to a handle, and a separate manually controlled disc clamping means.

BRIEF SUMMARY OF THE INVENTION

The present invention comprehends a device for grasping, manipulating and transporting disc-shaped phonograph records by means of a pair of curved moveable jaws which may be slid over the rim of a disc. The jaws can be made to pivot vertically together, thereby applying a compressure grasping force to the outer annular region of the disc. Pivotal motion of the jaws is produced by longitudinally slidable wedge-shaped buttons which force rear extension arms on each jaw vertically apart, thereby pivoting the front ends of the jaws vertically towards one another. The wedge-shaped buttons are slid towards one another by pressure applied on either button end by a finger and thumb, respectively.

Each wedge-shaped button has an outer height which tapers to smaller inner height and is fitted into an opposite end of a similarly tapered longitudinally disposed channel formed by longitudinal slots in both rear jaw extension arms. Sliding the buttons longitudinally towards the vertical center plane of the channel forces apart the rear jaw extensions which define the channel, thereby pivoting the front jaw sections inward towards one another. A flexible spring strip which is vertically oriented and spans the width of the device comprises the front surface of the longitudinal channel and also serves as a torsional spring tending to maintain the front ends of the jaws in an open position.

A helical compression spring spanning the distance between the inner opposing parallel vertical faces of the wedge-shaped buttons forces the buttons to outward positions in the absence of inward pressure on the buttons. Outward movement of the buttons is limited by vertically disposed members extending backward into the channel from the front surface of the channel near each channel opening. The inner vertical sides of the members are parallel to one another and to the outside vertical faces of rectangular bosses which extend forward from the front vertical surfaces of the wedge shaped buttons, near the inner opposed parallel vertical side surfaces of the buttons. The front vertical faces of the bosses are slidable longitudinally along the inner front surface of the longitudinal channel. Outward motion of the buttons is limited by contact between the outside vertical faces of the bosses and the inner vertical faces of the members.

OBJECTS OF THE INVENTION

An object of the present invention is to provide a device which permits phonograph record discs to be picked up, transported and placed on a phonograph turntable or other location without the necessity of touching the recorded grooved playing surface of the record with one's hands.

Another object of the invention is to provide a record holding and manipulating device which does not require contact of any sort with the playing surface of the record.

Another object of the invention is to provide a record holding and manipulating device which can be operated with a single hand.

Another object of the invention is to provide a record holding and manipulating device which can be operated without having to extend any part of the hand below a record to be grasped.

Another object of the invention is to provide a record holding and manipulating device which does not require engagement and accompanying wear of a record spindle hole.

Another object of the invention is to provide a record holding and manipulating device which automatically releases the record when the finger and thumb pressure is reduced on the device.

Various other objects and advantages of the present invention, and the most novel features, will be particularly pointed out hereinafter in connection with the appended claims.

It is to be understood that although the invention disclosed herein is fully capable of achieving the objects and providing the advantages mentioned, the structural and operational characteristics of the invention described herein are merely illustrative of the preferred embodiments. Accordingly, we do not intend the scope of our exclusive rights and privileges in the invention to be limited to the details of construction described, but only to those embodiments and their reasonable equivalents and adaptations delineated in the appended claims.

DETAILED DESCRIPTION OF THE INVENTION

Figure 1:
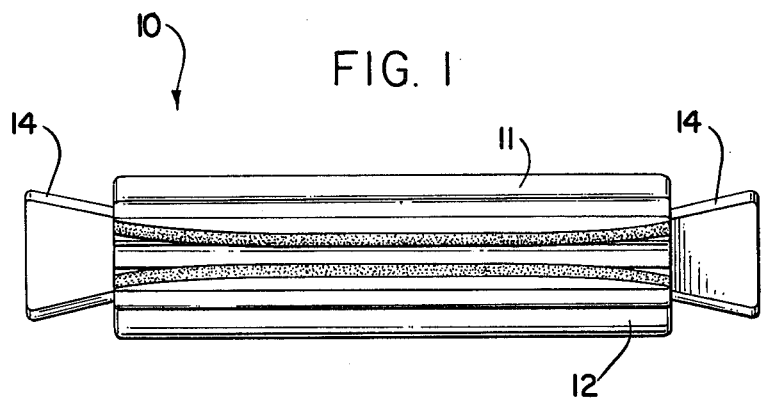
FIG. 1 is a front elevation view of the record holding device incorporating the features of the present invention.
Figure 2:
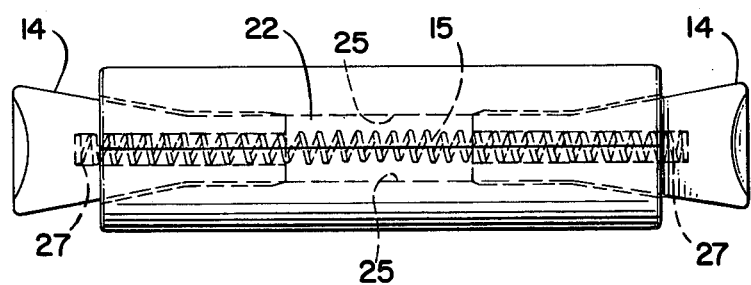
FIG. 2 is a rear elevation view of the device of FIG. 1.
Figure 3:
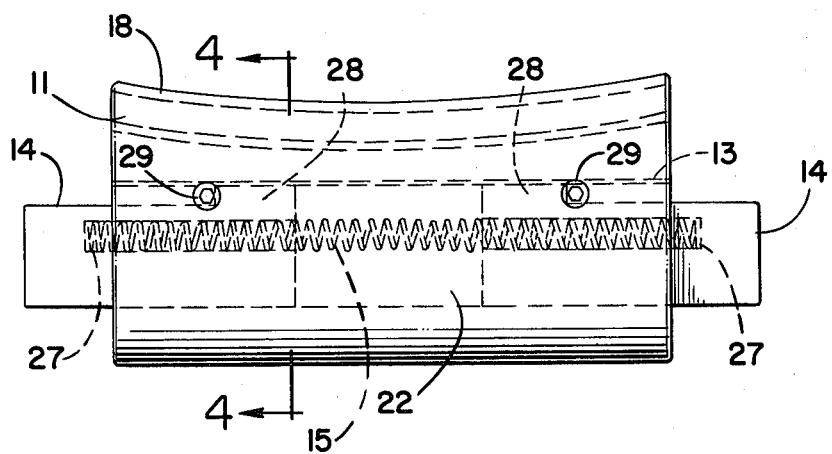
FIG. 3 is a top plan view of the device of FIG. 1.
Figure 4:
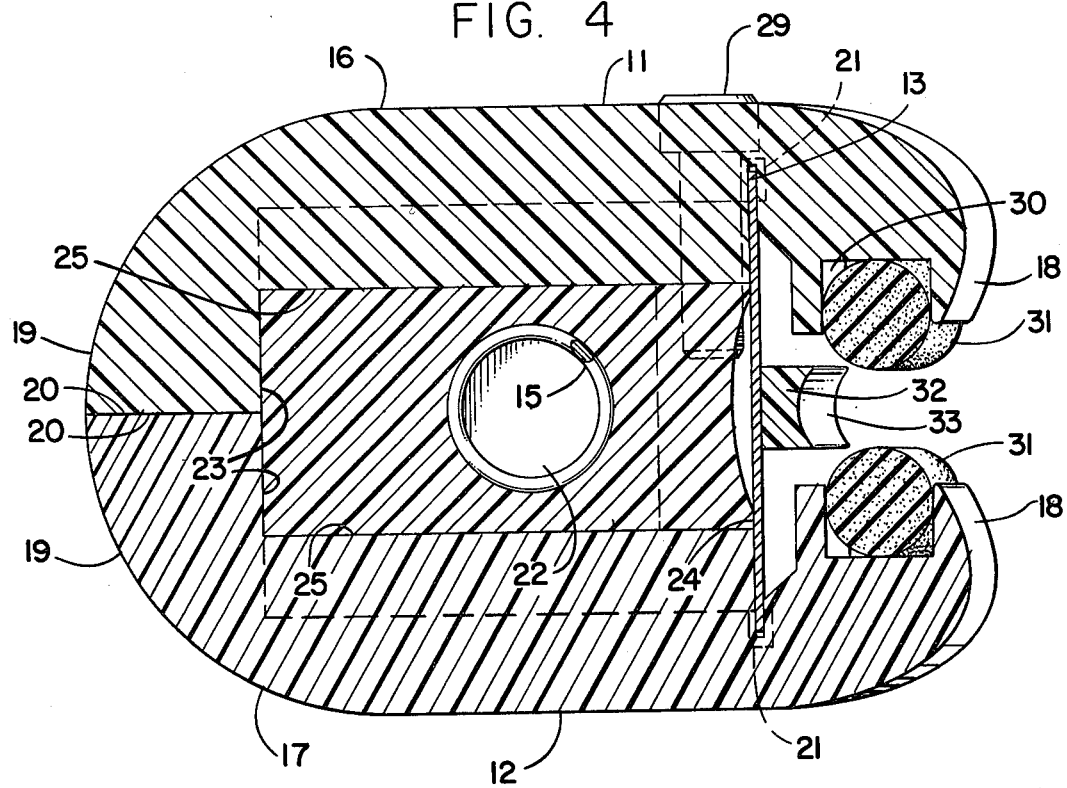
FIG. 4 is a cross-sectional view of the device taken along line 4—4 of FIG. 3.

Referring now to FIGS. 1 through 5 but especially to FIGS. 1-3, a record holding and manipulating device 10 is shown. The device comprises an upper pivotable jaw 11, a lower pivotable jaw 12, spring strip 13, which serves the functions of both a flexural spring and pivot fulcrum; tapered, wedge-shaped actuator buttons 14, and compression spring 15. As shown in FIG. 4, upper pivotable jaw 11 and lower pivotable jaw 12 each have uniform external cross-sectional elongated shapes which are mirror images of each other when reflected through the central horizontal plane of the device.

Upper pivotable jaw 11 and lower pivotable jaw 12 are joined together by spring strip 13 to form a horizontally elongated structure having opposed parallel vertical sides. Upper jaw center section top side 16 is substantially parallel to lower jaw center section bottom side 17. As shown in FIG. 3, the horizontal cross-section traces of front edges 18 of opposed jaws 11 and 12 are congruent concave circular arcs conformable to the rim of a phonograph record disc. As shown in FIG. 4, the vertical cross-section traces of front jaw edges 18 are smooth convex curves.

Jaws 11 and 12 each have rear extension arms 19 which extend horizontally backward from the front of the device, and terminate in perpendicular ends which extend vertically towards one another and towards the horizontal center plane of the device. Rear jaw extensions 19 have matching horizontal faces 20.

Jaws 11 and 12 are flexurally joined together by spring strip 13 which fits in vertical slots 21 in the inner parallel surfaces of the jaws. Slots 21 span the longitudinal width of jaws 11 and 12, and delineate the vertical boundary plane between the front and center sections of the jaws. Spring strip 13 is bonded to jaws 11 and 12 by an adhesive or ultrasonic weld.

In the preferred embodiment, spring strip 13 is made of steel of the type used in watch springs or flexible steel tape measures, and is fastened to jaws 11 and 12. With spring strip 13 in an unstressed position, rear jaw extension faces 20 butt against each other while front jaw sections 18 remain separated.

As may be seen best by referring to FIGS. 2, 3 and 4 the rear surface of spring strips 13 and the inner surfaces of jaws 11 and 12 define a longitudinal channel 22 which spans the width of the device. As may be seen best in FIGS. 3, 4 and 5, the inner vertical surfaces 23 of rear jaw extensions 19 define a substantially vertical rear surface for longitudinal channel 22. The rear surface 24 of spring strip 13 is substantially parallel to vertical surfaces 23 and defines a front surface for channel 22. As may be seen best by referring to FIG. 2, inner surfaces 25 spanning the width of jaws 11 and 12 define the upper and lower surfaces, respectively of longitudinal channel 22. As shown in FIG. 2, surfaces 25 are parallel horizontal planes for approximately that one-half of the jaw width centered on the vertical center plane of the device. Approximately one quarter of the jaw-width inward from either side of jaws 11 and 12, inner horizontal surfaces 25 of jaws 11 and 12 each diverge outward from the horizontal center plane of the device. The angle of divergence is approximately ten degrees, and the outward divergence of inner surfaces 25 results in entrance openings into either end of longitudinal channel 22 being tapered inward. Thus the height of longitudinal channel 22 becomes linearly smaller as a function of distance travelled from a channel opening until approximately one-fourth of the width of the channel has been traversed.

As may be seen best by referring to FIGS. 1, 2, 3, and 5, two tapered, wedge-shaped actuator buttons 14 are slidably positioned in opposite ends of longitudinal channel 22. As shown in FIG. 3, the horizontal cross-section shape of buttons 14 is substantially rectangular, with the long axis of the rectangle parallel to the horizontal mid-plane of longitudinal channel 22. As shown in FIG. 2, the shape of buttons 14 in a rear elevation view vertical cross-section is that of a regular trapezoid whose sloping sides conform to the tapered upper and lower entrance walls 25 of longitudinal channel 22.

Figure 5:
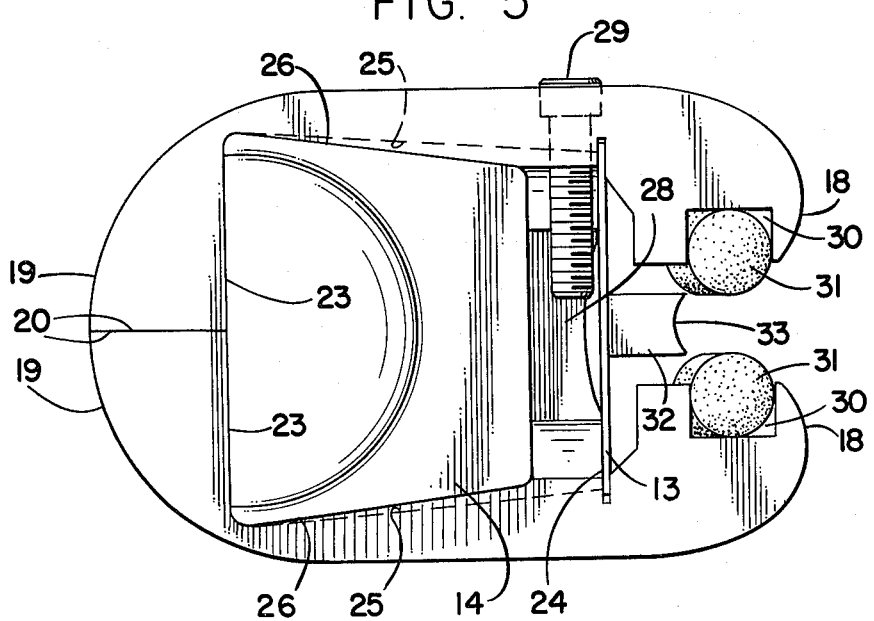
FIG. 5 is a side elevation view of the device of FIG. 1.

As may be seen best by referring to FIG. 5, upper and lower faces 26 of buttons 14 taper inward towards the horizontal center plane of the device, travelling from rear to front of the device.

As shown in FIGS. 2 and 3, a compression spring 15 is positioned approximately along the center line of longitudinal channel 22. The ends of the compression spring are inserted into blind holes 27 perpendicular to the inner parallel opposing face of buttons 14. Compression spring 15 is sufficiently long to force against the bottoms of blind holes 27 in buttons 14, pushing the buttons apart towards opposite ends of longitudinal channel 22.

As shown in FIGS. 3 and 5, buttons 14 have rectangular cross-section bosses 28 which extend perpendicularly forward from the front faces of buttons 14 towards the front of the device. The inner vertical faces of bosses 28 are congruent with the inner parallel opposing vertical faces of buttons 14. The outer side vertical faces of bosses 28, which sides define the widths of the bosses, are approximately one-fourth of a button longitudinal width back from the inner parallel vertical face of a button. Vertical screws or pins 29 protruding vertically downward from the top face of jaw 12 are positioned adjacent and parallel to the back surface 24 of spring strip 13. Under the extensile force of compression spring 15, buttons 14 are forced longitudinally outward until the rear vertical faces of bosses 28 abut against vertical pins 29, which thus serve as limit stops for the outward horizontal movement of buttons 14.

As may be seen best by referring to FIGS. 3, 5, 7 and 8, squeezing buttons 14 inward towards each other by applying pressure with the thumb and a finger on opposing vertical outer faces of buttons 14 causes the buttons to slide towards each other within the interior of channel 22. Concave depressions in the outer vertical faces of buttons 14 are provided to accommodate the convex curvature of the tips of the finger and thumb, facilitating a secure engagement of the buttons with the thumb and finger. The front surfaces of bosses 28 on buttons 14 slide horizontally in contact with the back surface 24 of spring strip 13. The back surface of buttons 14 slide horizontally in contact with the inner vertical surfaces 23 of rear jaw extensions 19. As may be seen best by referring to FIG. 5, the front surfaces of bosses 28 are slightly concave to minimize the contact area between the front surfaces and the back surface 24 of spring strip 13, thereby minimizing the sliding friction between bosses 28 and spring strip 13. The upper and lower surfaces of buttons 14 slide horizontally in contact with tapered horizontal inner surfaces 25 of jaws 11 and 12. As may be seen best referring to FIGS. 3, 5, 7 and 8, sliding buttons 14 towards the center of the device causes the height of tapered buttons 14 at the point of contact between the inner tapered horizontal channel surfaces 25 at the entrances to longitudinal channel 22 to increase.

Figure 8:
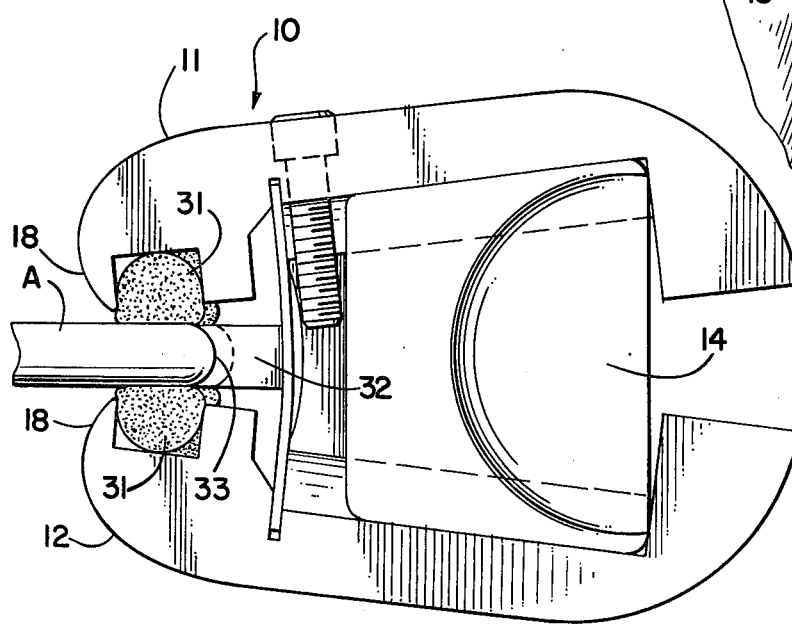
FIG. 8 is a side elevation view of the device of FIG. 1 showing how the device engages the edge of a phonograph record disc.

As shown in FIGS. 5 and 8, upper and lower faces 26 of buttons 14 are tapered in a transverse vertical cross-sectional plane. Upper and lower faces 26 are also tapered in a longitudinal vertical cross-sectional plane, as shown in FIG. 2 and previously discussed. Referring to FIGS. 5 and 8, it can be seen that upper and lower faces 26 of buttons 14 taper away from upper and lower surfaces 25 of channel 22, traversing the channel from rear to front. Thus the vertical separating force exerted on surfaces 25 by tapered buttons 26 being pushed into channel 22 is applied preferentially to the rear portions of surfaces 25. This results in an upward force being applied to the rear extension arm 19 of upper jaw 11, and a downward force being applied to the rear extension arm 19 of lower jaw 12. Accordingly, a net clockwise torque about the longitudinal axis of spring strip 13 is imposed in the upper jaw 11, while a counterclockwise torque is imposed on the lower jaw 12. As a result of these opposing torques, spring strip 13 is caused to deform cylindrically around its longitudinal axis, moving forward edges 18 of jaws 11 and 12 closer together.

As shown in FIG. 4, front jaw edges 18 each have curved vertical slots 30 which span the horizontal arm lengths of jaws 11 and 12. Resilient elastomeric strips 31 are bonded to the inner surfaces of slots 30 and extend vertically outward beyond the height of the slots. As may be seen best in FIG. 1, the depth of slots 30 increases gradually and slightly towards both sides of the jaws from the depth measured at the transverse vertical center plane of the device. Thus, with the jaws in an uncompressed position, the vertical distance between resilient strips 31 is greater at the two outer sides of the jaws than the vertical distance between the strips at the transverse vertical center plane of the device. The greater vertical spacing between the outer ends of the resilient strips 31 insures that when the jaws are compressed towards one another, the outer ends of resilient strips 31, which pivot at a greater radical distance from spring strip 13 and thus execute a greater vertical translation than the center portion of the resilient strips which are at a smaller radial distance from spring strip 13, will meet the same distance from the horizontal center plane at the device, thereby exerting a uniform grasping pressure on a record placed between the jaws. In an alternative embodiment, slots 30 may have a constant depth, while the height of resilient strips 31 tapers to a smaller height at the outer ends of the jaws. Segments of rubber "O" rings having round or square cross-sections are suitable for use as strips 31.

Figure 6:
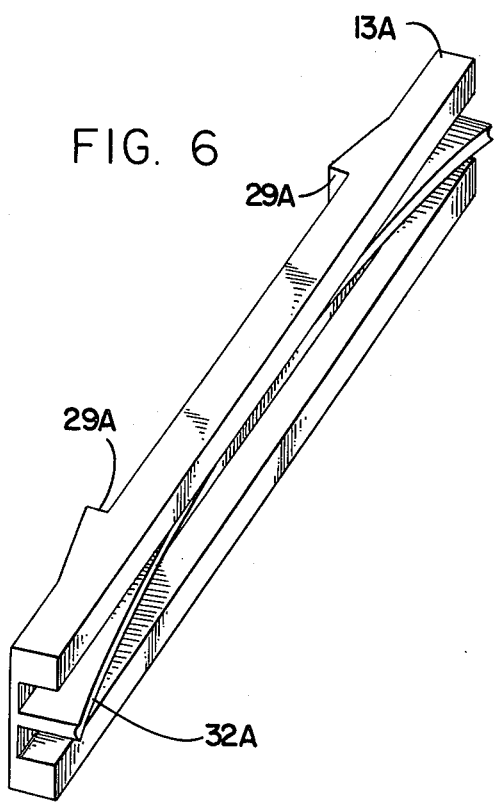
FIG. 6 is a front perspective view of an alternate embodiment of a component of the device shown in FIGS. 1 through 5.

Congruent with the back edges of curved resilient strips 31 is a curved rail 32 which spans the horizontal arc length of jaws 11 and 12. Rail 32 is bonded to front of spring strip 13 at its center line. The front surface 33 of rail 32 has a uniform concave vertical cross-section shape adopted to conform to the curved outer rim of a phonograph record disc. Alternatively, a spring strip of flexible plastic material may be used in place of steel spring strip 13. The alternate embodiment, shown in FIG. 6, comprises a flexible plastic spring strip 13A, an integral curved rail 32A and integral, vertically disposed stop members 29A extending backward from the back surface of spring strip 13A. The alternate embodiment comprising integral spring strip 13A, curved rail 32A and stop members 29A may be fabricated by injection molding or other suitable process.

OPERATION OF THE INVENTION

Figure 7:
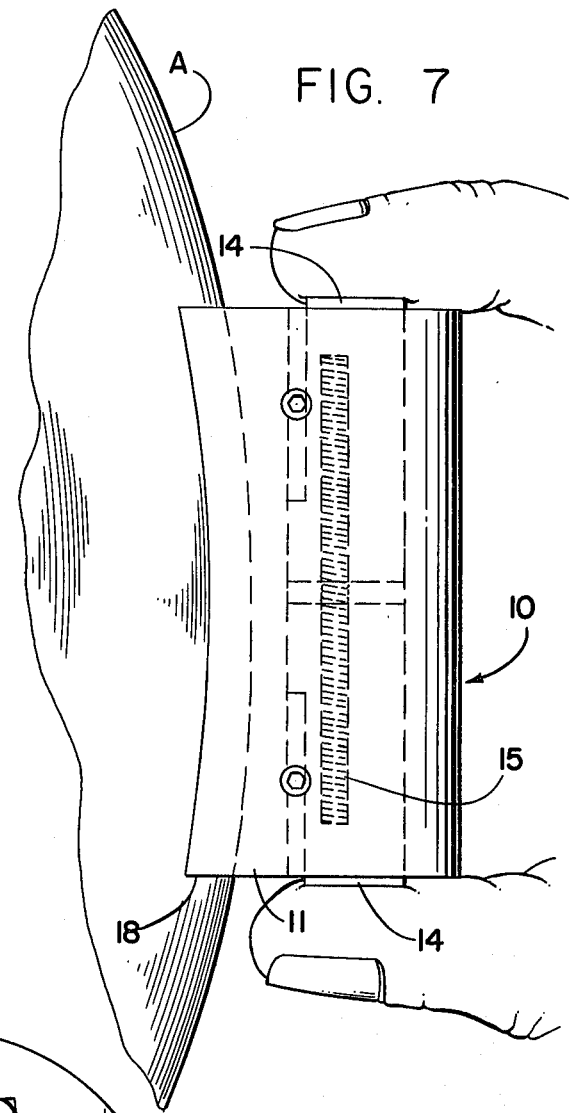
FIG. 7 is a top plan view of the device of FIG. 1 showing how the device is operated to grasp a phonograph record disc.

Referring to FIGS. 7 and 8, it may be seen that sliding the device 10 over the edge a phonograph record disc A causes the forward motion of jaws 11 and 12 to be limited by contact of front surface 33 of rail 32 with the rim of record A. In this position front curved edges 18 of jaws 11 and 12 are congruent with the outer annular region of record disc A which does not contain information-bearing grooves. Squeezing buttons 14 together between a thumb and finger causes the front edges 18 of jaws 11 and 12 to close vertically towards one another until contact is made between the facing surfaces of resilient strip 31 and the non-recorded annular outer region of the record. With the record gripped compressively between resilient strips 31, it may be manipulated and transported as desired. To release the compressive gripping force on the record after placing it in a desired position such as on a turntable or within a protective jacket, pressure on buttons 14 is released. This allows compression spring 15 to push buttons 14 to their maximum outward positions, and spring strip 13 to return to its unstressed position in which jaw front edges 18 are at their maximum vertical separation.

What is claimed is:

1. A device for grasping, holding, manipulating and transporting phonograph record discs comprising:
   (a) An elongated horizontal upper jaw member having a forward extending front jaw section and a rearward extending jaw extension,
   (b) An elongated horizontal lower jaw member having a forward extending front jaw section and a rearward extending jaw extension, said lower jaw member being substantially the mirror image of said upper jaw member and being disposed parallel to and underneath said upper jaw member,
   (c) A vertically oriented, horizontally disposed spring strip spanning the width of said upper and lower jaws and joining the inner surfaces of said upper and lower jaws at the vertical plane defining the boundary between the front jaw sections and the rear jaw extensions,
   (d) A longitudinal channel behind the spring strip spanning the width of the said upper and lower jaws and having symmetrical entrance openings in opposite sides of said upper and lower jaws, said entrance openings tapering uniformly to a smaller-dimension opening towards a plane vertically bisecting said channel,
   (e) Opposed actuator buttons slidably mounted in opposite side ends of said channel and having a tapered cross-section substantially conforming to the tapered cross-section of said channel openings,
   (f) Spring means for maintaining said actuator buttons in outward positions,
   (g) Stop means for limiting the outward movement of said actuator buttons, whereby squeezing said actuator buttons towards one another causes said rear jaw extensions to move vertically apart, and said front jaw sections to pivot vertically together.

2. The device of claim 1 further comprising a downward curving leg continuous with said rear extension of said upper jaw and an upward curving leg continuous with said rear extension of said lower jaw, whereby contact between said downward and upward curving legs limit the vertical separation of said front jaw sections.

3. The device of claim 2 wherein said jaw front sections are further defined as having front edges describing, in a transverse vertical plane, smooth convex curves.

4. The device of claim 3 further comprising resilient uniform cross-section strips fastened to the inner-facing parallel surfaces of said front jaw sections and spanning the width of said front jaw sections behind and concentric with the front edges of said jaw sections.

5. The device of claim 4 wherein the spacing between the inner facing surfaces of said resilient strips is greater at the outer sides of said jaw sections than the spacing at the transverse vertical center plane of the device.

6. The device of claim 5 wherein said jaw front sections are further defined as having front edges describing, in a horizontal plane, concave circular arcs conformable to the rim of a circular record disc.

7. The device of claim 6 further comprising a curved uniform cross-section rail strip having a concave front edge, said rail strip spanning the width of said front sections, said rail strip lying in the horizontal center plane of the device and maintained in position by being fastened to the front edge of said spring strip.

8. The device of claim 7 wherein said actuator buttons are further described as having a rectangular horizontal cross-sectional slope.

9. The device of claim 8 wherein said channel has a rectangular horizontal cross-section, a rectangular transverse vertical cross of constant height in the central portion of the channel tapering to a larger height at the entrance openings to the channel, and a longitudinal vertical cross-sectional shape defined as a rectangle symmetrically positioned about the transverse vertical center plane and horizontal center of the plane device, and identical tapered openings describing regular trapezoids symmetrically disposed about the horizontal center plane of the device at either end of the device.

10. The device of claim 9 wherein said actuator buttons are further described as having a longitudinal vertical cross-sectional shape defined as a rectangle symmetrically positioned about the horizontal center plane of the device and, joined to the outer vertical side of the rectangle, a regular trapezoid whose sides taper to conform to the increased opening height in said channel.

11. The device of claim 10 wherein said actuator buttons are further described as having a transverse vertical cross-sectional shape defined as a regular trapezoid whose larger base is parallel to and near the back of said rear jaw extensions, and whose smaller base is parallel to and near said spring strip.

12. The device of claim 11 wherein said spring means are further defined as a compression spring spanning the width of the device within said channel, opposite ends of said spring being inserted into inner facing longitudinal blind holes formed in said actuator buttons.

13. The device of claim 12 wherein said stop means are further defined as comprising in combination rectangular horizontal cross-section bosses protruding forward from the inner vertical surfaces of said actuator buttons, and vertically disposed members extending backward into said channel from the rear surface of said spring strip, whereby outward movement of said actuator buttons is limited by contact of the outer vertical side of said bosses with said vertically disposed members.

14. The device of claim 13 wherein said vertically disposed members are further defined as comprising pins protruding inward from at least one horizontal jaw surface.

15. The device of claim 14 wherein said spring strip is made of steel.

16. The device of claim 13 wherein said vertically disposed members are further defined as comprising elongated uniform cross-section members protruding backward into said channel near the front surface of said channel.

17. The device of claim 14 wherein said spring strip is made of plastic.

18. The device of claim 17 wherein said vertically disposed members are further defined as being integral with the rear of said plastic spring strip.

19. The device of claim 18 wherein said curved uniform cross-section rail is integral with said plastic spring strip.

* * * * *